US009031258B2

(12) United States Patent
Kitago et al.

(10) Patent No.: US 9,031,258 B2
(45) Date of Patent: May 12, 2015

(54) ACOUSTIC FEEDBACK SUPPRESSION APPARATUS, MICROPHONE APPARATUS, AMPLIFIER APPARATUS, SOUND AMPLIFICATION SYSTEM, AND ACOUSTIC FEEDBACK SUPPRESSION METHOD

(75) Inventors: Ryosuke Kitago, Fukuoka (JP); Yuji Kawasaki, Fukuoka (JP); Keiji Yamahai, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 384 days.

(21) Appl. No.: 13/512,175

(22) PCT Filed: Nov. 25, 2010

(86) PCT No.: PCT/JP2010/006891
§ 371 (c)(1), (2), (4) Date: May 25, 2012

(87) PCT Pub. No.: WO2011/065003
PCT Pub. Date: Jun. 3, 2011

(65) Prior Publication Data

US 2012/0281855 A1 Nov. 8, 2012

(30) Foreign Application Priority Data

Nov. 30, 2009 (JP) ................................ 2009-271186

(51) Int. Cl.
*H04B 15/00* (2006.01)
*H04R 3/02* (2006.01)

(52) U.S. Cl.
CPC ........................................ *H04R 3/02* (2013.01)

(58) Field of Classification Search
CPC ........ H04R 3/02; H04R 25/453; H04R 27/00; H04M 9/082; G10L 2021/02082
USPC ...................................................... 381/93, 95
See application file for complete search history.

(56) References Cited

U.S. PATENT DOCUMENTS 5,396,550 A * 3/1995 Kim ......................... 379/390.03
5,442,712 A * 8/1995 Kawamura et al. ............ 381/83

(Continued)

FOREIGN PATENT DOCUMENTS

CN 1918942 2/2007
CN 200966147 10/2007

(Continued)

OTHER PUBLICATIONS

Chinese Office Action and Search Report, mailed Mar. 25, 2014, from The State Intellectual Property Office (SIPO) for the corresponding Chinese Application No. 201080054196.2 (together with an English language translation thereof).

(Continued)

*Primary Examiner* — Simon Sing
(74) *Attorney, Agent, or Firm* — Greenblum & Bernstein, P.L.C.

(57) ABSTRACT

An acoustic feedback suppression apparatus includes an amplitude measurement section for measuring the amplitude of a sound signal input from a microphone, an amplitude attenuation section for attenuating the amplitude of a sound signal output to a speaker, and an acoustic feedback determination section for determining whether or not acoustic feedback is occurring based on the sound signal input from the microphone. If it is determined that acoustic feedback is occurring, a sound-deadening control section enables sound-deadening control so that the amplitude of the sound signal output to the speaker is attenuated to a sound-deadening level. A sound-deadening release section releases the sound-deadening control if the amplitude of the sound signal input from the microphone is more than specified threshold amplitude and if it is determined that acoustic feedback is not occurring while the sound-deadening control is conducted.

12 Claims, 12 Drawing Sheets

(56) References Cited

U.S. PATENT DOCUMENTS

| | | | | |
|---|---|---|---|---|
| 5,729,614 | A | 3/1998 | Nagata et al. | |
| 6,097,971 | A * | 8/2000 | Hosoi | 455/570 |
| 6,377,679 | B1 * | 4/2002 | Hashimoto et al. | 379/388.05 |
| 6,901,143 | B1 * | 5/2005 | Ono | 379/414 |
| 2003/0076948 | A1 * | 4/2003 | Nishimura | 379/406.01 |
| 2003/0123674 | A1 * | 7/2003 | Boland | 381/66 |
| 2007/0172080 | A1 | 7/2007 | Janse et al. | |
| 2010/0202641 | A1 | 8/2010 | Guo | |
| 2010/0329474 | A1 | 12/2010 | Ura | |

FOREIGN PATENT DOCUMENTS

| | | | | |
|---|---|---|---|---|
| CN | 101820574 | | 9/2010 | |
| GB | 2246688 | * | 2/1992 | H04B 1/10 |
| JP | 61-144198 | | 7/1986 | |
| JP | 3-237899 | | 10/1991 | |
| JP | 05-268120 | | 10/1993 | |
| JP | 6-205494 | | 7/1994 | |
| JP | 6-283949 | | 10/1994 | |
| JP | 2006-121188 | | 5/2006 | |
| JP | 2006-197407 | | 7/2006 | |
| JP | 2006-279684 | | 10/2006 | |
| JP | 2007-201896 | | 8/2007 | |
| JP | 2009-225101 | | 10/2009 | |
| WO | 2010/087147 | | 8/2010 | |

OTHER PUBLICATIONS

International Search Report, mailed Mar. 1, 2011, for corresponding International Application No. PCT/JP2010/006891.

International Preliminary Report, mailed Jul. 19, 2012, for corresponding International Application No. PCT/JP2010/006891.

Japan Office Action, mailed Apr. 20, 2010, in corresponding Japanese Application No. 2009-271186.

* cited by examiner

ACOUSTIC FEEDBACK SUPPRESSION APPARATUS, MICROPHONE APPARATUS, AMPLIFIER APPARATUS, SOUND AMPLIFICATION SYSTEM, AND ACOUSTIC FEEDBACK SUPPRESSION METHOD

TECHNICAL FIELD

The present invention relates to an acoustic feedback suppression apparatus having a function of suppressing acoustic feedback for use in a sound amplification system which amplifies with a speaker a sound signal input from a microphone.

BACKGROUND ART

Conventionally, there has been known as an acoustic feedback prevention apparatus for use in a sound system, a apparatus for detecting acoustic feedback based on a sound signal input from a microphone and removing the acoustic feedback component by using a band rejection filter corresponding to an acoustic feedback frequency (see, for example, Patent Literature 1). However, in some cases, it was difficult to sufficiently remove the acoustic feedback component only by the use of the band rejection filter.

Accordingly, there has been proposed an acoustic feedback prevention apparatus which determines that acoustic feedback is independently occurring if a sound signal input from a microphone is in a soundless state (in the state without sound signal components except an acoustic feedback component) and mutes (deadens) the sound signal to be output (see, for example, Patent Literature 2). The acoustic feedback prevention apparatus determines the probability of acoustic feedback in every band based on the sound signal input from the microphone, lowers the signal level in those bands with a high probability of acoustic feedback with a notch filter, determines whether or not the input sound signal is under the soundless state based on the signal level filtered with the notch filter, and sets the level of the sound signal to be output at zero upon determination of the signal being under the soundless state.

However, in the conventional acoustic feedback suppression apparatus, when a sound signal in the same band as the band determined to have a high probability of acoustic feedback was input from the microphone while output sound signals are muted (deadened), the muted (deadened) state was not canceled and thereby a phenomenon of a speech head interruption (a phenomenon in which the first portion of a speech (head of speech) of a user is not amplified) might occur.

CITATION LIST

Patent Literature

Patent Literature 1: Japanese Patent Laid-Open No. 61-144198

Patent Literature 2: Japanese Patent Laid-Open No. 2006-279684

SUMMARY OF INVENTION

Technical Problem

The present invention is invented under the above-mentioned circumstances. An object of the present invention is to provide an acoustic feedback suppression apparatus capable of sufficiently suppressing occurrence of acoustic feedback and suppressing the phenomenon of a speech head interruption.

Solution to Problem

One aspect of the present invention is an acoustic feedback suppression apparatus, the acoustic feedback suppression apparatus including: an amplitude measurement section for measuring amplitude of a sound signal input from a microphone; an amplitude attenuation section for attenuating amplitude of a sound signal output to a speaker; an acoustic feedback determination section for determining whether or not acoustic feedback is occurring based on the sound signal input from the microphone; a level control section for enabling level control of the amplitude attenuation section so that the amplitude of the sound signal output to the speaker is attenuated to a specified level if it is determined by the acoustic feedback determination section that acoustic feedback is occurring; and a level control release section for maintaining the level control of the amplitude attenuation section if the amplitude of the sound signal measured by the amplitude measurement section is equal to or less than specified threshold amplitude while the level control is conducted, and releasing the level control of the amplitude attenuation section if the amplitude of the sound signal measured by the amplitude measurement section is more than the specified threshold amplitude and if it is determined by the acoustic feedback determination section that acoustic feedback is not occurring.

Another aspect of the present invention is a microphone apparatus, the microphone apparatus including: a microphone; an amplitude measurement section for measuring amplitude of a sound signal input from the microphone; an amplitude attenuation section for attenuating amplitude of a sound signal output to a speaker; an acoustic feedback determination section for determining whether or not acoustic feedback is occurring based on the sound signal input from the microphone; a level control section for enabling level control of the amplitude attenuation section so that the amplitude of the sound signal output to the speaker is attenuated to a specified level if it is determined by the acoustic feedback determination section that acoustic feedback is occurring; and a level control release section for maintaining the level control of the amplitude attenuation section if the amplitude of the sound signal measured by the amplitude measurement section is equal to or less than specified threshold amplitude while the level control is conducted, and releasing the level control of the amplitude attenuation section if the amplitude of the sound signal measured by the amplitude measurement section is more than the specified threshold amplitude and if it is determined by the acoustic feedback determination section that acoustic feedback is not occurring.

Another aspect of the present invention is an amplifier apparatus, the amplifier apparatus including: an amplifier section for amplifying a sound signal output to a speaker; an amplitude measurement section for measuring amplitude of a sound signal input from a microphone; an amplitude attenuation section for attenuating the amplitude of the sound signal output to the speaker; an acoustic feedback determination section for determining whether or not acoustic feedback is occurring based on the sound signal input from the microphone; a level control section for enabling level control of the amplitude attenuation section so that the amplitude of the sound signal output to the speaker is attenuated to a specified level if it is determined by the acoustic feedback determination section that acoustic feedback is occurring; and a level control release section for maintaining the level control of the amplitude attenuation section if the amplitude of the sound signal measured by the amplitude measurement section is equal to or less than specified threshold amplitude while the level control is conducted, and releasing the level control of the amplitude attenuation section if the amplitude of the sound signal measured by the amplitude measurement section is more than the specified threshold amplitude and if it is determined by the acoustic feedback determination section that acoustic feedback is not occurring.

Still another aspect of the present invention is a sound amplification system, the sound amplification system including: a microphone; a speaker; an amplifier section for amplifying a sound signal output to the speaker; an amplitude measurement section for measuring amplitude of a sound signal input from the microphone; an amplitude attenuation section for attenuating amplitude of the sound signal output to the speaker; an acoustic feedback determination section for determining whether or not acoustic feedback is occurring based on the sound signal input from the microphone; a level control section for enabling level control of the amplitude attenuation section so that the amplitude of the sound signal output to the speaker is attenuated to a specified level if it is determined by the acoustic feedback determination section that acoustic feedback is occurring; and a level control release section for maintaining the level control of the amplitude attenuation section if the amplitude of the sound signal measured by the amplitude measurement section is equal to or less than specified threshold amplitude while the level control is conducted, and releasing the level control of the amplitude attenuation section if the amplitude of the sound signal measured by the amplitude measurement section is more than the specified threshold amplitude and if it is determined by the acoustic feedback determination section that acoustic feedback is not occurring.

Still another aspect of the present invention is an acoustic feedback suppression method, the acoustic feedback suppression method including the steps of: determining whether or not acoustic feedback is occurring based on a sound signal input from a microphone; enabling level control so that amplitude of a sound signal output to a speaker is attenuated to a specified level if it is determined that the acoustic feedback is occurring; and maintaining the level control if the amplitude of the sound signal input from the microphone is equal to or less than specified threshold amplitude while the level control is conducted, and releasing the level control if the amplitude of the sound signal input from the microphone is more than the specified threshold amplitude and if it is determined that acoustic feedback is not occurring.

As shown in the following description, the present invention includes other aspects. Therefore, the disclosure of the invention is intended to provide a part of the aspects of the invention, and is not intended to limit the scope of the invention described and claimed herein.

DESCRIPTION OF EMBODIMENTS

Figure 1:
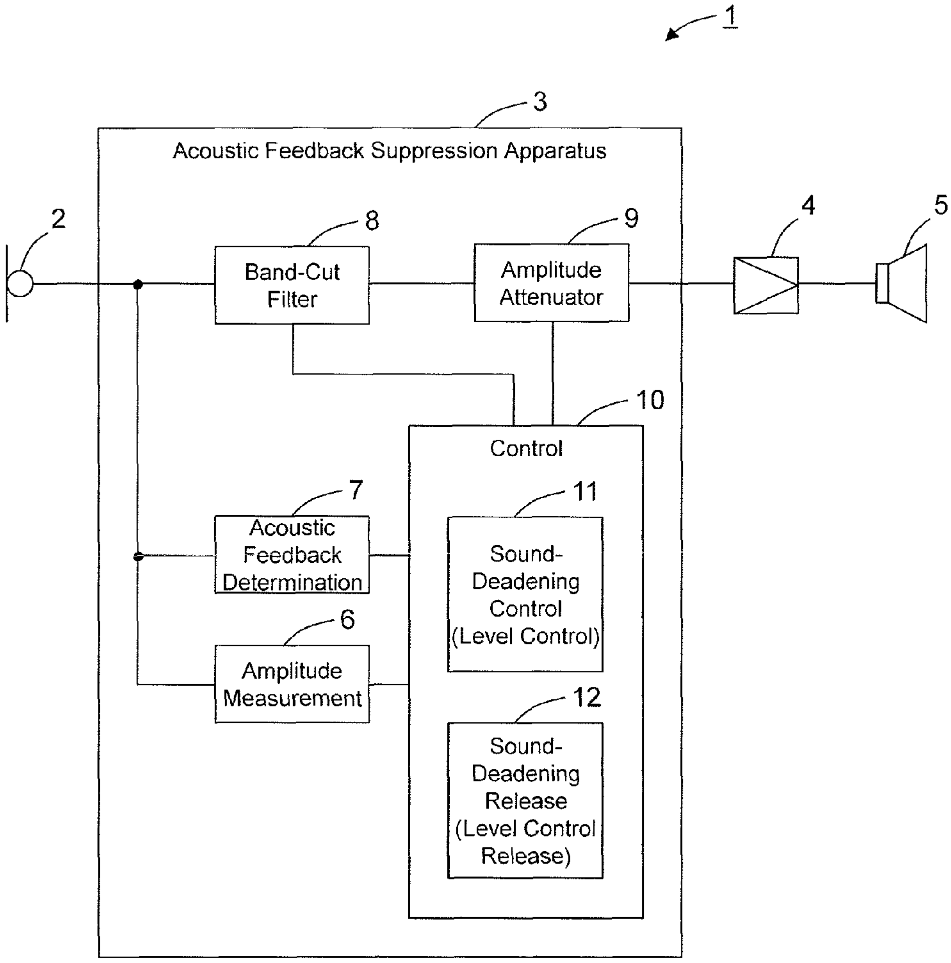
FIG. 1 is a block diagram showing the configuration of a sound amplification system and an acoustic feedback suppression apparatus in an embodiment of the present invention.

Hereinafter, the present invention will be described in detail. It should be understood that the following detailed description and accompanying drawings are not intended to limit the scope of the invention.

An acoustic feedback suppression apparatus of the present invention is configured to include: an amplitude measurement section for measuring amplitude of a sound signal input from a microphone; an amplitude attenuation section for attenuating amplitude of a sound signal output to a speaker; an acoustic feedback determination section for determining whether or not acoustic feedback is occurring based on the sound signal input from the microphone; a level control section for enabling level control of the amplitude attenuation section so that the amplitude of the sound signal output to the speaker is attenuated to a specified level if it is determined by the acoustic feedback determination section that acoustic feedback is occurring; and a level control release section for maintaining the level control of the amplitude attenuation section if the amplitude of the sound signal measured by the amplitude measurement section is equal to or less than specified threshold amplitude while the level control is conducted, and releasing the level control of the amplitude attenuation section if the amplitude of the sound signal measured by the amplitude measurement section is more than the specified threshold amplitude and if it is determined by the acoustic feedback determination section that acoustic feedback is not occurring.

With this configuration, it is determined whether or not acoustic feedback is occurring based on the sound signal (input signal) input from the microphone, and if it is determined that the acoustic feedback is occurring, level control is conducted to attenuate the amplitude of the sound signal (output signal) output to the speaker to the specified level, which makes it possible to sufficiently suppress occurrence of the acoustic feedback. Moreover, if the amplitude of the sound signal (input signal) input from the microphone is large enough and if it is determined that the acoustic feedback is not occurring when the level control is conducted, then the level control is released and thereby occurrence of the phenomenon of a speech head interruption can be suppressed.

The acoustic feedback suppression apparatus of the present invention may be configured such that the level control section is a sound-deadening control section for enabling sound-deadening control of the amplitude attenuation section so that the amplitude of the sound signal output to the speaker is attenuated to a sound-deadening level if it is determined by the acoustic feedback determination section that acoustic feedback is occurring, and the level control release section is a sound-deadening release section for maintaining sound-deadening control of the amplitude attenuation section if the amplitude of the sound signal measured by the amplitude measurement section is equal to or less than specified threshold amplitude in a state where the sound-deadening control is conducted, and releasing the sound-deadening control of the amplitude attenuation section if the amplitude of the sound signal measured by the amplitude measurement section is more than the specified threshold amplitude and if it is determined by the acoustic feedback determination section that acoustic feedback is not occurring.

With this configuration, it is determined whether or not acoustic feedback is occurring based on the sound signal (input signal) input from the microphone, and if it is determined that the acoustic feedback is occurring, then sound-deadening control is conducted to attenuate the amplitude of the sound signal (output signal) output to the speaker to the sound-deadening level, which makes it possible to sufficiently suppress occurrence of the acoustic feedback. Moreover, if the amplitude of the sound signal (input signal) input from the microphone is large enough and if it is determined that the acoustic feedback is not occurring when the sound-deadening control is conducted, then the sound-deadening control is released and thereby occurrence of the phenomenon of a speech head interruption can be suppressed.

The acoustic feedback suppression apparatus of the present invention may be configured such that the sound-deadening control section can perform multi-stage sound-deadening control, the multi-stage sound-deadening control including: controlling the amplitude attenuation section to enable intermediate control for attenuating the amplitude of the sound signal output to the speaker if it is determined that the acoustic feedback is occurring while sound-deadening control is not conducted; and controlling the amplitude attenuation section to enable the sound-deadening control for attenuating the amplitude of the sound signal output to the speaker to the sound-deadening level if it is determined that the acoustic feedback is occurring in a second state where the intermediate control is conducted, and if the amplitude of the sound signal measured by the amplitude measurement section is more than the threshold amplitude and if it is determined that the acoustic feedback is not occurring in a third state where the sound-deadening control is conducted, the sound-deadening release section releases the sound-deadening control and returns the third state to the first state or the second state.

This configuration allows multi-stage sound-deadening control and makes it possible to appropriately suppress acoustic feedback depending on various situations. More specifically, if it is determined that the acoustic feedback is occurring while sound-deadening control is not conducted (first state), then the intermediate control is conducted to attenuate the amplitude of the sound signal (output signal) output to the speaker, whereas if it is determined that the acoustic feedback is occurring while the intermediate control is conducted (second state), then sound-deadening control is conducted to attenuate the amplitude of the sound signal (output signal) output to the speaker to the sound-deadening level.

The acoustic feedback suppression apparatus of the present invention may be configured to further include a band-pass filter section for decreasing amplitude in a specific frequency band of the sound signal output to the speaker, in which the sound-deadening control section can perform multi-stage sound-deadening control, the multi-stage sound-deadening control including: controlling at least one of the amplitude attenuation section and the band-pass filter section to enable intermediate control for attenuating or decreasing the amplitude of the sound signal output to the speaker if it is determined that the acoustic feedback is occurring while sound-deadening control is not conducted; and controlling the amplitude attenuation section to enable the sound-deadening control for attenuating the amplitude of the sound signal output to the speaker to the sound-deadening level if it is determined that the acoustic feedback is occurring in the second state where the intermediate control is conducted, and if the amplitude of the sound signal measured by the amplitude measurement section is more than the threshold amplitude and if it is determined that the acoustic feedback is not occurring in the third state where the sound-deadening control is conducted, the sound-deadening release section releases the sound-deadening control and returns the third state to the first state or the second state.

This configuration allows multi-stage sound-deadening control and makes it possible to appropriately suppress acoustic feedback depending on various situations. More specifically, if it is determined that the acoustic feedback is occurring while sound-deadening control is not conducted (first state), then the intermediate control is conducted to attenuate or decrease the amplitude of the sound signal (output signal) output to the speaker, whereas if it is determined that the acoustic feedback is occurring in the state (second state) where the intermediate control is conducted, then sound-deadening control is conducted to attenuate the amplitude of the sound signal (output signal) output to the speaker to the sound-deadening level.

The acoustic feedback suppression apparatus of the present invention may be configured such that the level control section is a low volume control section for enabling low volume control of the amplitude attenuation section so that the amplitude of the sound signal output to the speaker is attenuated to a low volume level if it is determined by the acoustic feedback determination section that acoustic feedback is occurring, and the level control release section is a low volume release section for maintaining the low volume control of the amplitude attenuation section if the amplitude of the sound signal measured by the amplitude measurement section is equal to or less than specified threshold amplitude in a state where the sound-deadening control is conducted, and releasing the low volume control of the amplitude attenuation section if the amplitude of the sound signal measured by the amplitude measurement section is more than the specified threshold amplitude and if it is determined by the acoustic feedback determination section that acoustic feedback is not occurring.

With this configuration, it is determined whether or not acoustic feedback is occurring based on the sound signal (input signal) input from the microphone, and if it is determined that the acoustic feedback is occurring, low volume control is conducted to attenuate the amplitude of the sound signal (output signal) output to the speaker to the low volume level, which makes it possible to sufficiently suppress occurrence of the acoustic feedback. Moreover, if the amplitude of the sound signal (input signal) input from the microphone is large enough and if it is determined that the acoustic feedback is not occurring when the low volume control is conducted, then the low volume control is released and thereby occurrence of the phenomenon of a speech head interruption can be suppressed.

The acoustic feedback suppression apparatus of the present invention may be configured such that the low volume control section can enable multi-stage low volume control, the multi-stage low volume control including: controlling the amplitude attenuation section to enable intermediate control for attenuating the amplitude of the sound signal output to the speaker if it is determined that the acoustic feedback is occurring in a first state where low volume control is not conducted; and controlling the amplitude attenuation section to enable the low volume control for attenuating the amplitude of the sound signal output to the speaker to a low volume level if it is determined that the acoustic feedback is occurring in a second state where the intermediate control is conducted, and if the amplitude of the sound signal measured by the amplitude measurement section is more than the threshold amplitude and if it is determined that the acoustic feedback is not occurring in a third state where the low volume control is conducted, the low volume release section releases the low volume control and returns the third state to the first state or the second state.

This configuration allows multi-stage low volume control and makes it possible to appropriately suppress acoustic feedback depending on various situations. More specifically, if it is determined that the acoustic feedback is occurring while low volume control is not conducted (first state), then the intermediate control is conducted to attenuate the amplitude of the sound signal (output signal) output to the speaker, whereas if it is determined that the acoustic feedback is occurring while the intermediate control is conducted (second state), then low volume control is conducted to attenuate the amplitude of the sound signal (output signal) output to the speaker to the low volume level.

The acoustic feedback suppression apparatus of the present invention may be configured to further include a band-pass filter section for decreasing amplitude in a specific frequency band of the sound signal output to the speaker, in which the low volume control section can enable multi-stage low volume control, the multi-stage low volume control including: controlling at least one of the amplitude attenuation section and the band-pass filter section to enable intermediate control for attenuating or decreasing the amplitude of the sound signal output to the speaker if it is determined that the acoustic feedback is occurring in the first state where low volume control is not conducted; and controlling the amplitude attenuation section to enable the low volume control for attenuating the amplitude of the sound signal output to the speaker to a low volume level if it is determined that the acoustic feedback is occurring in the second state where the intermediate control is conducted, and if the amplitude of the sound signal measured by the amplitude measurement section is more than the threshold amplitude and if it is determined that the acoustic feedback is not occurring in the third state where the low volume control is conducted, the low volume release section releases the low volume control and returns the third state to the first state or the second state.

This configuration allows multi-stage low volume control and makes it possible to appropriately suppress acoustic feedback depending on various situations. More specifically, if it is determined that the acoustic feedback is occurring while low volume control is not conducted (first state), then the intermediate control is conducted to attenuate or decrease the amplitude of the sound signal (output signal) output to the speaker, whereas if it is determined that the acoustic feedback is occurring while the intermediate control is conducted (second state), then low volume control is conducted to attenuate the amplitude of the sound signal (output signal) output to the speaker to the low volume level.

A microphone apparatus of the present invention is configured to include: a microphone; an amplitude measurement section for measuring amplitude of a sound signal input from the microphone; an amplitude attenuation section for attenuating amplitude of a sound signal output to a speaker; an acoustic feedback determination section for determining whether or not acoustic feedback is occurring based on the sound signal input from the microphone; a level control section for enabling level control of the amplitude attenuation section so that the amplitude of the sound signal output to the speaker is attenuated to a specified level if it is determined by the acoustic feedback determination section that acoustic feedback is occurring; and a level control release section for maintaining the level control of the amplitude attenuation section if the amplitude of the sound signal measured by the amplitude measurement section is equal to or less than specified threshold amplitude while the level control is conducted, and releasing the level control of the amplitude attenuation section if the amplitude of the sound signal measured by the amplitude measurement section is more than the specified threshold amplitude and if it is determined by the acoustic feedback determination section that acoustic feedback is not occurring.

As in the case of the above-stated acoustic feedback suppression apparatus, the microphone apparatus can sufficiently suppress occurrence of acoustic feedback and suppress occurrence of the phenomenon of a speech head interruption.

An amplifier apparatus of the present invention is configured to include: an amplifier section for amplifying a sound signal output to a speaker; an amplitude measurement section for measuring amplitude of a sound signal input from a microphone; an amplitude attenuation section for attenuating amplitude of the sound signal output to the speaker; an acoustic feedback determination section for determining whether or not acoustic feedback is occurring based on the sound signal input from the microphone; a level control section for enabling level control of the amplitude attenuation section so that the amplitude of the sound signal output to the speaker is attenuated to a specified level if it is determined by the acoustic feedback determination section that acoustic feedback is occurring; and a level control release section for maintaining the level control of the amplitude attenuation section if the amplitude of the sound signal measured by the amplitude measurement section is equal to or less than specified threshold amplitude while the level control is conducted, and releasing the level control of the amplitude attenuation section if the amplitude of the sound signal measured by the amplitude measurement section is more than the specified threshold amplitude and if it is determined by the acoustic feedback determination section that acoustic feedback is not occurring.

As in the case of the above-stated acoustic feedback suppression apparatus, the amplifier apparatus can sufficiently suppress occurrence of acoustic feedback and suppress occurrence of the phenomenon of a speech head interruption.

A sound amplification system of the present invention is configured to include: a microphone; a speaker; an amplifier section for amplifying a sound signal output to the speaker; an amplitude measurement section for measuring amplitude of a sound signal input from the microphone; an amplitude attenuation section for attenuating amplitude of the sound signal output to the speaker; an acoustic feedback determination section for determining whether or not acoustic feedback is occurring based on the sound signal input from the microphone; a level control section for enabling level control of the amplitude attenuation section so that the amplitude of the sound signal output to the speaker is attenuated to a specified level if it is determined by the acoustic feedback determination section that acoustic feedback is occurring; and a level control release section for maintaining the level control of the amplitude attenuation section if the amplitude of the sound signal measured by the amplitude measurement section is equal to or less than specified threshold amplitude while the level control is conducted, and releasing the level control of the amplitude attenuation section if the amplitude of the sound signal measured by the amplitude measurement section is more than the specified threshold amplitude and if it is determined by the acoustic feedback determination section that acoustic feedback is not occurring.

As in the case of the above-stated acoustic feedback suppression apparatus, the sound amplification system can sufficiently suppress occurrence of acoustic feedback and suppress occurrence of the phenomenon of a speech head interruption.

An acoustic feedback suppression method of the present invention includes the steps of: determining whether or not acoustic feedback is occurring based on a sound signal input from a microphone; enabling level control so that amplitude of a sound signal output to a speaker is attenuated to a specified level if it is determined that the acoustic feedback is occurring; maintaining the level control if the amplitude of the sound signal input from the microphone is equal to or less than specified threshold amplitude while the level control is conducted, and releasing the level control if the amplitude of the sound signal input from the microphone is more than the specified threshold amplitude and if it is determined that acoustic feedback is not occurring.

As in the case of the above-stated apparatus and system, the method can sufficiently suppress occurrence of acoustic feedback and suppress occurrence of the phenomenon of a speech head interruption.

In the present invention, a level control means for enabling level control and a level release means for releasing level control are provided, which makes it possible to sufficiently suppress occurrence of acoustic feedback and to suppress occurrence of the phenomenon of a speech head interruption.

Hereinafter, an acoustic feedback suppression apparatus in the embodiment of the present invention will be described with reference to the drawings. In the present embodiment, an acoustic feedback suppression apparatus for use in a sound amplification system which amplifies with a speaker a sound signal input from a microphone and the like is shown as an example. The sound amplification system of the present invention includes phone systems such as teleconferencing systems and handsfree phone systems in addition to general sound systems.

A description will be given of the configuration of the acoustic feedback suppression apparatus in the embodiment of the present invention with reference to the drawings. FIG. 1 is a block diagram showing the configuration of a sound amplification system and an acoustic feedback suppression apparatus in the present embodiment. As shown in FIG. 1, a sound amplification system 1 of the present embodiment includes a microphone 2, an acoustic feedback suppression apparatus 3, a power amplifier 4, and a speaker 5.

The acoustic feedback suppression apparatus 3 includes an amplitude measurement section 6 for measuring the amplitude of a sound signal (input signal) input from the microphone 2 and an acoustic feedback determination section 7 for determining whether or not acoustic feedback is occurring based on the sound signal input from the microphone 2. It is to be noted that the determination of the presence of acoustic feedback can be made by use of publicly known technologies. For example, the acoustic feedback determination section 7 determines the presence of acoustic feedback based on the peak of a signal level detected from the sound signal.

The acoustic feedback suppression apparatus 3 also includes a band-cut filter 8 for decreasing the amplitude in a specific frequency band of the sound signal (output signal) output to the speaker 5 via the power amplifier 4, and an amplitude attenuator 9 for attenuating the amplitude of the sound signal output to the speaker 5 via the power amplifier 4. The band-cut filter 8 is equivalent to a band-pass filter means of the present invention, and the amplitude attenuator 9 is equivalent to an amplitude attenuation means of the present invention.

Figure 2:
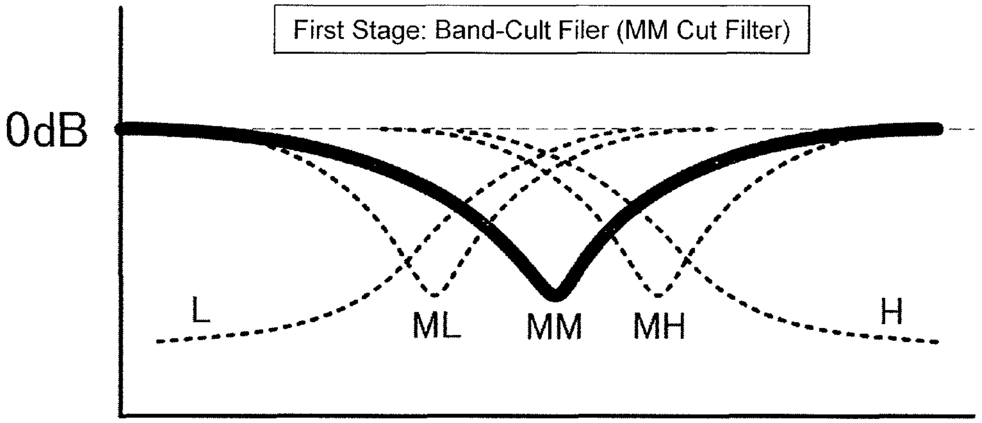
FIG. 2 is an explanatory view of intermediate control (first stage) in the acoustic feedback suppression apparatus in the embodiment of the present invention.

The band-cut filter 8 is configured so that five types of band-cut filters (e.g., L cut filter (HPF), ML cut filter, MM cut filter, MH cut filter, H cut filter (LPF)) can selectively be used (see FIG. 2). In the example of FIG. 2, MM cut filter is used to decrease the amplitude. Although the band-cut filter 8 involving selective use of five types of band-cut filters was showed above, the scope of the present invention is not necessarily limited thereto. Band-cut filters involving four or less types and six or more types of filters may be used and also a notch filter may be used.

Figure 3:
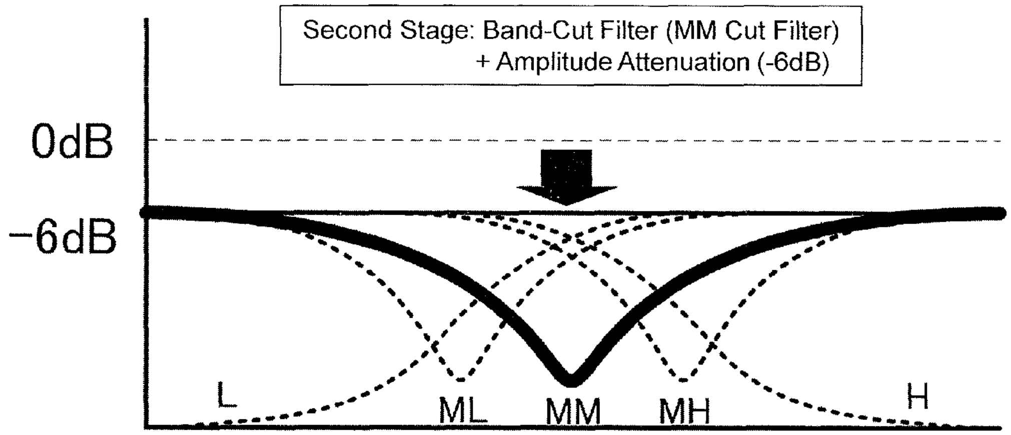
FIG. 3 is an explanatory view of the intermediate control (second stage) in the acoustic feedback suppression apparatus in the embodiment of the present invention.
Figure 4:
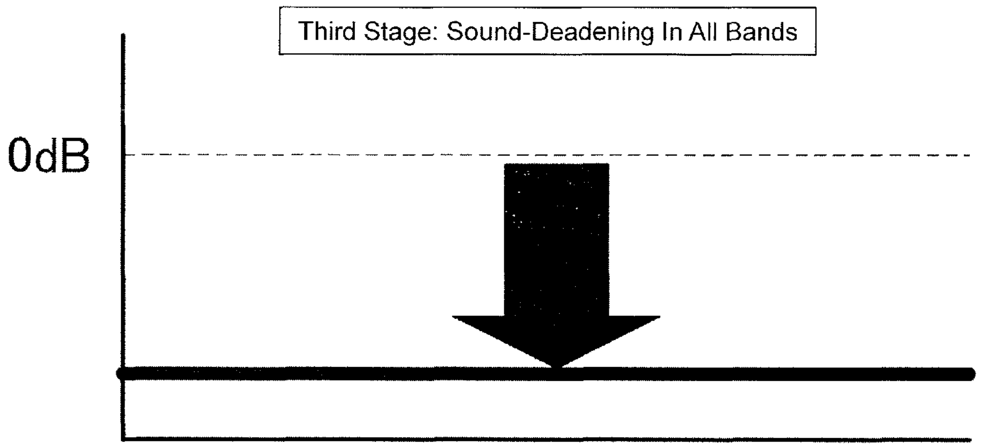
FIG. 4 is an explanatory view of sound-deadening control (third stage) in the acoustic feedback suppression apparatus in the embodiment of the present invention.

The amplitude attenuator 9 has an amplitude attenuation mode in which the amplitude in all the bands is attenuated by 6 dB, and a sound-deadening mode in which the amplitude in all the bands is attenuated to a sound-deadening level (see FIG. 3 and FIG. 4). In the sound-deadening mode, the amplitude in all the bands may be lowered to a zero level or be lowered to low levels close to the zero level (levels substantially as low as the zero level). In short, the sound-deadening level includes not only a complete zero level but also levels substantially as low as the zero level. Although the amplitude attenuation mode for attenuating the amplitude in all the bands by 6 dB was shown, the amount amplitude attenuation may be other than 6 dB, and multiple amplitude attenuation modes with different attenuation amounts may also be provided. If the amount of attenuation amplitude, which is 6 dB in the present embodiment, is too small, a difference between a first stage and a second stage mostly disappears (the first stage and the second stage become almost the same), which eliminates the significance of providing the second stage. Meanwhile, if the amount of attenuation amplitude is too large, the effect of sound amplification in the second stage may be damaged.

The acoustic feedback suppression apparatus 3 includes a control section 10 which controls the band-cut filter 8 and the amplitude attenuator 9. The control section 10 is constituted from apparatuses such as CPUs and microcomputers and includes a sound-deadening control section 11 for enabling sound-deadening control with use of the band-cut filter 8 and the amplitude attenuator 9 and a sound-deadening release section 12 for releasing sound-deadening control.

The sound-deadening control section 11 enables sound-deadening control of the amplitude attenuator 9 so that the amplitude of the sound signal output to the speaker 5 is attenuated to a sound-deadening level if it is determined by the acoustic feedback determination section 7 that acoustic feedback is occurring. The sound-deadening control may be conducted in multiple stages as shown below (see FIG. 5).

More specifically, when it is determined that acoustic feedback is occurring while sound-deadening control is not conducted (normal state), intermediate control for partially attenuating the amplitude in a specific band (control on the first stage) is conducted with use of the band-cut filter 8 corresponding to the frequency band of the acoustic feedback (see FIG. 2). Further, if it is determined that acoustic feedback is occurring even while the intermediate control is conducted (in the state of first stage), intermediate control (control on the second stage) is conducted for attenuating the amplitude in all the bands by 6 dB with use of the amplitude attenuator 9 (see FIG. 3). If it is determined that acoustic feedback is occurring also while the intermediate control is conducted (in the state of second stage), sound-deadening control (control on the third stage) is conducted for attenuating the amplitude in all the bands to the sound-deadening level with use of the amplitude attenuator 9 (see FIG. 4).

The sound-deadening release section 12 releases the sound-deadening control if the amplitude of the sound signal (input signal) measured by the amplitude measurement section 6 is more than specified threshold amplitude and if it is determined by the acoustic feedback determination section 7 that acoustic feedback is not occurring while the above sound-deadening control is conducted. The specified threshold amplitude is an amplitude used as a criterion of determining whether or not a sound has been detected and is set at, for example, ⅓ and ⅕ of the total amplitude in a dynamic range in amplitude measurement. The sound-deadening release may also be performed in multiple stages as shown below (see FIG. 5).

More specifically, if it is determined that the amplitude of the sound signal measured by the amplitude measurement section 6 is more than threshold amplitude while the sound-deadening control is conducted (in the state of third stage), the sound-deadening control is released (changed to the intermediate control for amplitude attenuation by 6 dB) and the third stage is shifted to the second stage. It is to be noted that the shift from the third stage to the second stage may be triggered by a lapse of a predetermined time (e.g., 5 seconds) after the shift to the third stage.

If it is determined that acoustic feedback is not occurring after a lapse of a predetermined reference time after the shift to the second stage while the intermediate control for amplitude attenuation by 6 dB is conducted (in the state of the second stage), then the intermediate control is released (the intermediate control for amplitude attenuation by 6 dB is changed to intermediate control only with use of the band-cut filter 8) and the second stage is shifted to the first stage. It is to be noted that the reference time in this case is set at 5 seconds in the case where the first stage is shifted to the second stage and set at 1 second in the case where the third stage is shifted to the second stage for example.

If it is determined that acoustic feedback is not occurring after a lapse of the predetermined reference time after the shift to the first stage while the intermediate control with use of only the band-cut filter 8 is conducted (first state), then the intermediate control is released and the first stage is shifted to the normal state. It is to be noted that the reference time in this case is set at 5 seconds in the case where the normal state is shifted to the first stage and set at 1 second in the case where the second stage is shifted to the first stage for example.

A description will be given of the operation of the thus-configured acoustic feedback suppression apparatus 3 with reference to the drawings. Particularly, the operation in the case where multi-stage sound-deadening control is conducted in the acoustic feedback suppression apparatus 3 of the present embodiment will be described in detail.

Figure 5:
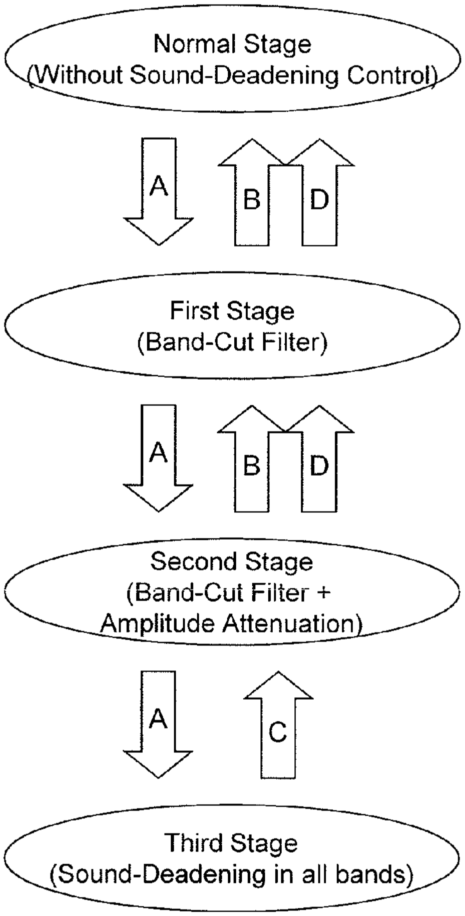
FIG. 5 is a view explaining the operation of multi-stage sound-deadening control in the acoustic feedback suppression apparatus in the embodiment of the present invention.

FIG. 5 is a view explaining the operation in the case where multi-stage sound-deadening control is conducted in the acoustic feedback suppression apparatus 3 of the present embodiment. First, when the acoustic feedback suppression apparatus 3 operates in the normal state as shown in FIG. 5, sound-deadening control (and intermediate control) is not conducted, and a sound signal input from the microphone 2 is output as it is.

If it is determined that acoustic feedback is occurring in this normal state (shown with arrow A in FIG. 5), the intermediate control for partially decreasing the amplitude in a specific band is conducted with use of the band-cut filter 8 corresponding to the frequency band of the acoustic feedback, by which the normal state is shifted to the first stage (see FIG. 2).

Next, if it is determined that acoustic feedback is occurring in this first stage (arrow A), the amplitude in the specific band is partially decreased with use of the band-cut filter 8 (e.g., MM cut filter) corresponding to the frequency band of the acoustic feedback, while the intermediate control is conducted for attenuating the amplitude in all the bands by 6 dB with use of the amplitude attenuator 9, by which the first stage is shifted to the second stage (see FIG. 3). If it is determined in this first stage that acoustic feedback is not occurring after a lapse of the reference time (e.g., 5 seconds) after the shift from the normal state (shown with arrow B in FIG. 5), then the intermediate control with use of the band-cut filter 8 is released and the first stage is shifted to the normal state.

Next, if it is determined that acoustic feedback is occurring in the second stage (arrow A), then the sound-deadening control is conducted for decreasing the amplitude in all the bands to a sound-deadening level with use of the amplitude attenuator 9, by which the second stage is shifted to the third stage (see FIG. 4). If it is determined in this second stage that acoustic feedback is not occurring after a lapse of the reference time (e.g., 5 seconds) after the shift from the first stage (arrow B), the intermediate control for enabling attenuation by 6 dB with use of the amplitude attenuator 9 is released, by which the second stage is shifted to the first stage.

If it is determined in the third stage that the amplitude of the measured sound signal is more than threshold amplitude, or if a predetermined time (e.g., 5 seconds) elapses after the shift to the third stage (shown with arrow C in FIG. 5), then the sound-deadening control with use of the amplitude attenuator 9 is released, and the third stage is shifted to the second stage.

Next, if it is determined in the second stage that acoustic feedback is not occurring after a lapse of the reference time (e.g., 1 second) after the shift from the third stage (shown with arrow D in FIG. 5), the intermediate control for enabling attenuation by 6 dB with use of the amplitude attenuator 9 is released, by which the second stage is shifted to the first stage.

Next, if it is determined in the first stage that acoustic feedback is not occurring after a lapse of the reference time (e.g., 1 second) after the shift from the second stage (arrow D), then the intermediate control with use of the band-cut filter 8 is released and the first stage is shifted to the normal state.

Although the sound-deadening control in three stages (first stage, second stage, and third stage) starting from the normal state has been explained with reference to FIG. 5 in the above description, it should naturally be understood that the multi-stage sound-deadening control includes sound-deadening control other than the three-stage control. For example, a stage for changing the band-cut filter 8 (e.g., change from MM cut filter to MH cut filter) or a stage for using a plurality of band-cut filters 8 (MM cut filter+MH cut filter) may be added to the three-stage control of the present embodiment, or amplitude attenuation may be conducted in multiple stages (e.g., attenuation by 3 dB followed by attenuation by 6 dB). Alternatively, shift of the stages may be conducted in such manner that a certain stage among the three stages in the present embodiment may be skipped.

According to such an acoustic feedback suppression apparatus 3 in the embodiment of the present invention, the sound-deadening control section 11 for enabling sound-deadening control and the sound-deadening release section 12 for releasing the sound-deadening control are provided, so that occurrence of acoustic feedback can sufficiently be suppressed and occurrence of the phenomenon of a speech head interruption can be suppressed.

More specifically, in the present embodiment, it is determined whether or not acoustic feedback is occurring based on the sound signal (input signal) input from the microphone 2, and if it is determined that the acoustic feedback is occurring, then sound-deadening control is conducted to attenuate the amplitude of the sound signal (output signal) output to the speaker 5 to the sound-deadening level, so that occurrence of the acoustic feedback can sufficiently be suppressed. Moreover, if the amplitude of the sound signal (input signal) input from the microphone 2 is large enough and if it is determined that the acoustic feedback is not occurring when the sound-deadening control is conducted, the sound-deadening control is released so that occurrence of the phenomenon of a speech head interruption can be suppressed.

Further in this case, the sound-deadening control is released on the basis of not only the occurrence of acoustic feedback but also the amplitude of the sound signal (input signal) input from the microphone 2, which makes it possible to appropriately determine whether or not the sound-deadening control should be released.

In the present embodiment, the multi-stage sound-deadening control can be performed as shown in FIG. 5, which makes it possible to appropriately suppress acoustic feedback depending on various situations. More specifically, if it is determined that acoustic feedback is occurring while sound-deadening control is not conducted (first state=normal state), the intermediate control is conducted to partially attenuate or decrease the amplitude of the sound signal (output signal) output to the speaker 5, whereas if it is determined that the acoustic feedback is occurring in the state (the second state=the state of the first stage or the second stage) where the intermediate control is conducted, then sound-deadening control is conducted to attenuate the amplitude of the sound signal (output signal) output to the speaker 5 to the sound-deadening level.

It becomes possible to cope with such a situation that acoustic feedback is occurring in a plurality of frequency bands for example. More specifically, if it is determined that acoustic feedback is occurring in a certain frequency band (first frequency band), then intermediate control is conducted to partially attenuate or decrease the amplitude of the sound signal (output signal) output to the speaker 5, so that the acoustic feedback in the first frequency band can be suppressed. If it is determined that acoustic feedback is occurring in another frequency band (second frequency band) even after such acoustic feedback suppression is conducted, then sound-deadening control is conducted to attenuate the amplitude of the sound signal (output signal) output to the speaker 5 to the sound-deadening level so that the acoustic feedback in the second frequency band can be suppressed.

Although the embodiments of the present invention have been described in an illustrative manner, it should be understood that the scope of the present invention is not limited to the embodiments described, and modifications and variations depending on purposes are possible within the scope stated in the claims.

For example, in the above description, the sound amplification system 1 was shown in which the acoustic feedback suppression apparatus 3 having the acoustic feedback suppression function of the present invention was interposed in between the microphone 2 and the power amplifier 4. However, the scope of the present invention is not limited thereto. That is, the acoustic feedback suppression function of the present invention may be provided to the microphone 2, and in that case, a microphone apparatus having the acoustic feedback suppression function of the present invention is provided. Moreover, the acoustic feedback suppression function of the present invention may be provided to the power amplifier 4, and in that case, an amplifier apparatus having the acoustic feedback suppression function of the present invention is provided.

Figure 6:
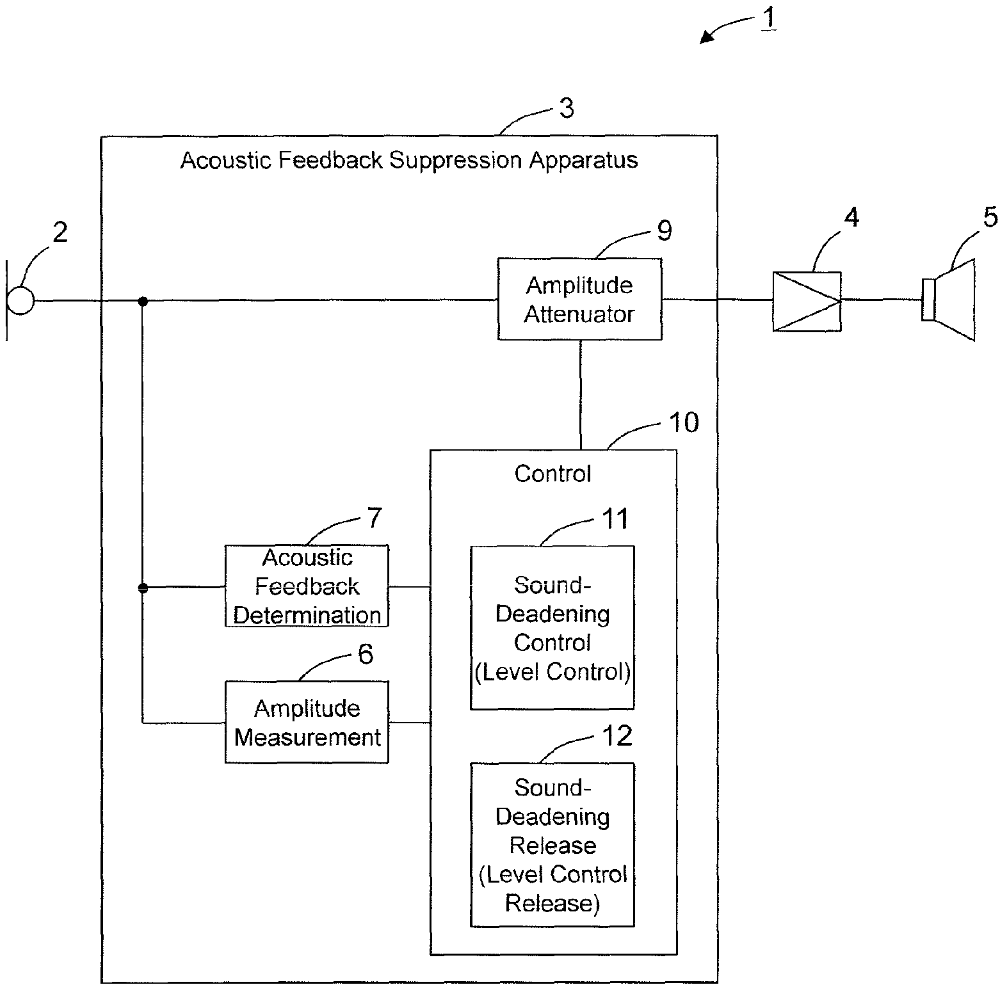
FIG. 6 is a block diagram showing the configuration of a sound amplification system and an acoustic feedback suppression apparatus in another embodiment of the present invention.
Figure 7:
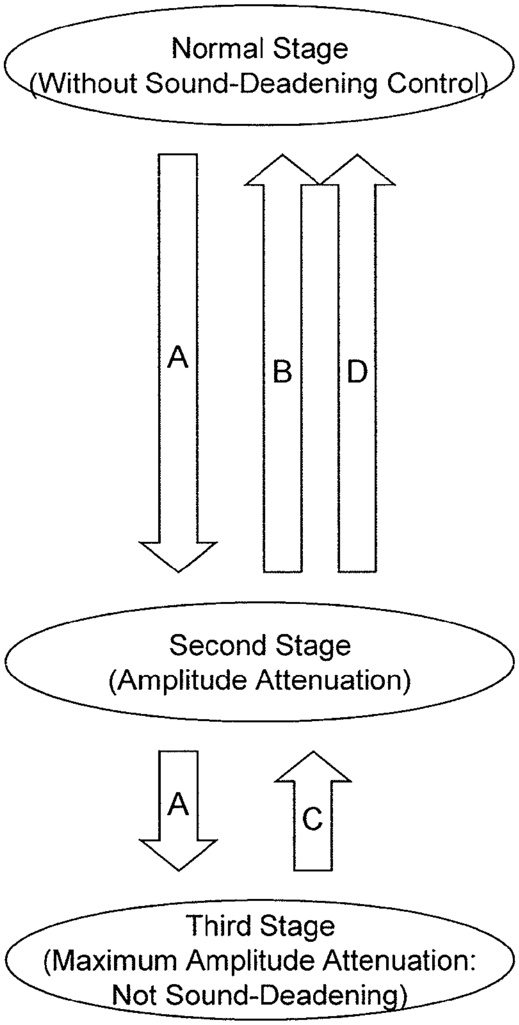
FIG. 7 is a view explaining the operation of multi-stage sound-deadening control in another embodiment.
Figure 8:
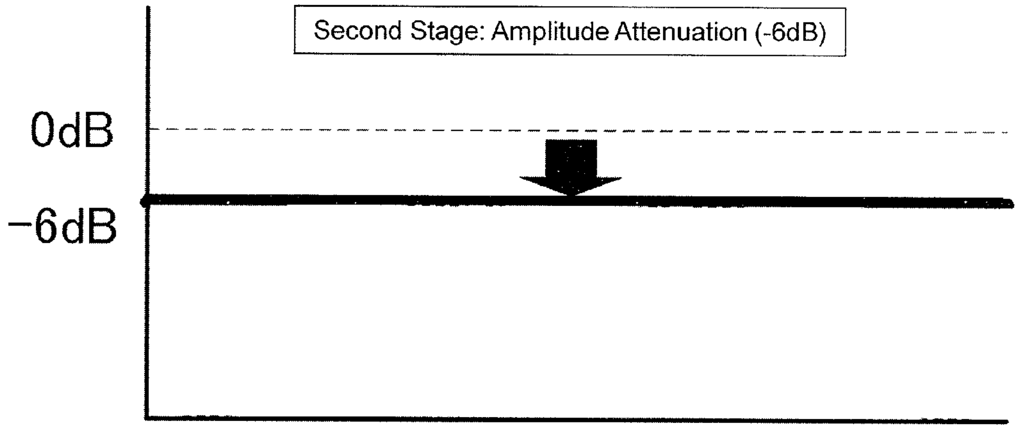
FIG. 8 is an explanatory view of intermediate control (second stage) in another embodiment.
Figure 9:
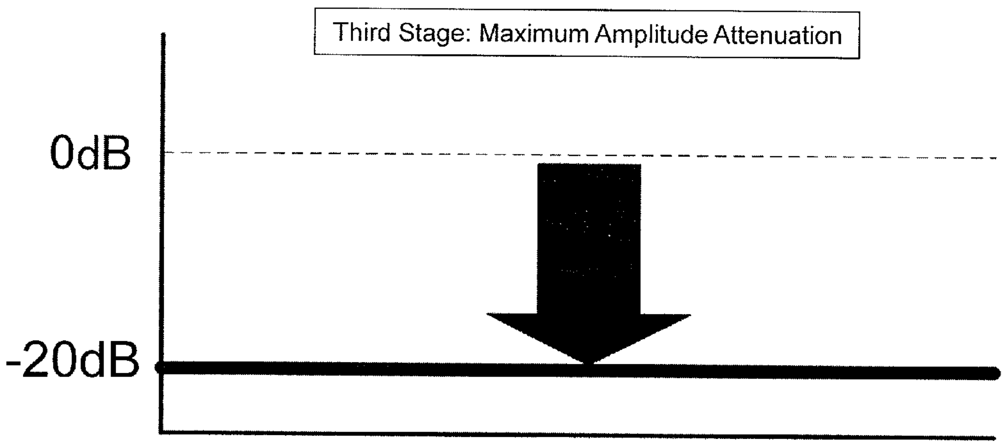
FIG. 9 is an explanatory view of sound-deadening control (third stage) in another embodiment.
Figure 10:
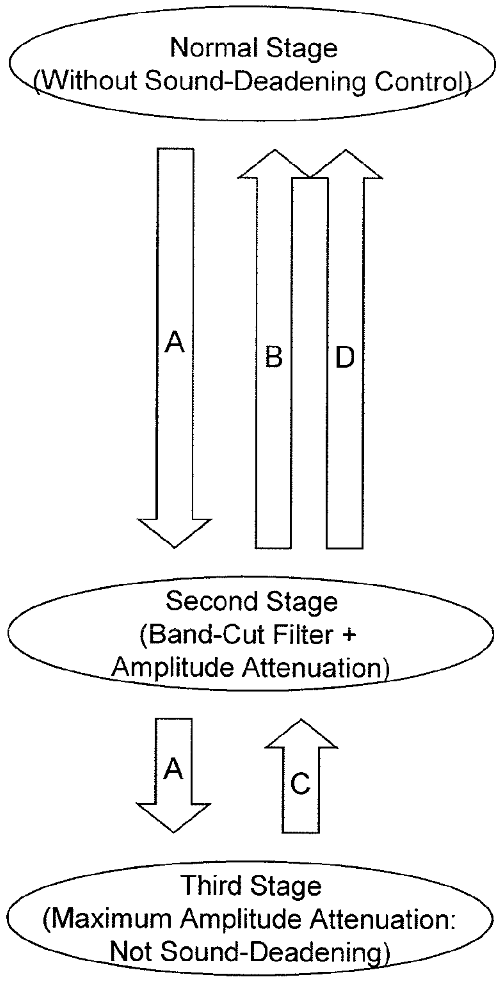
FIG. 10 is a view explaining the operation of multi-stage sound-deadening control in still another embodiment.
Figure 11:
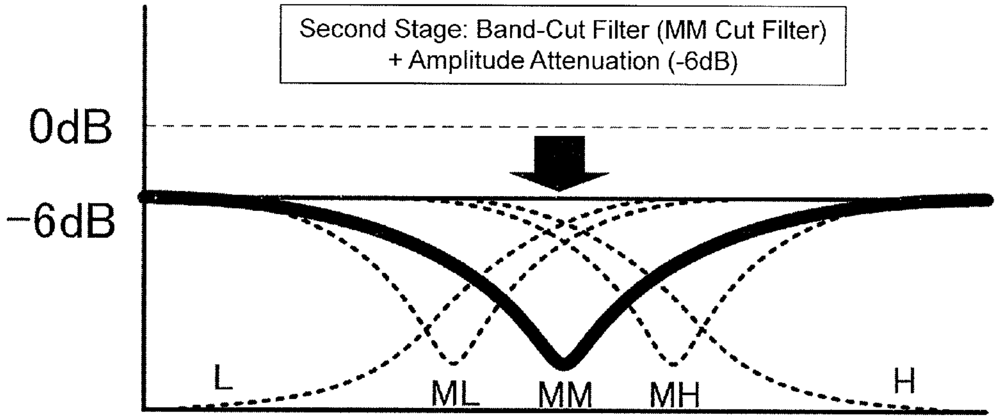
FIG. 11 is an explanatory view of intermediate control (second stage) in still another embodiment.
Figure 12:
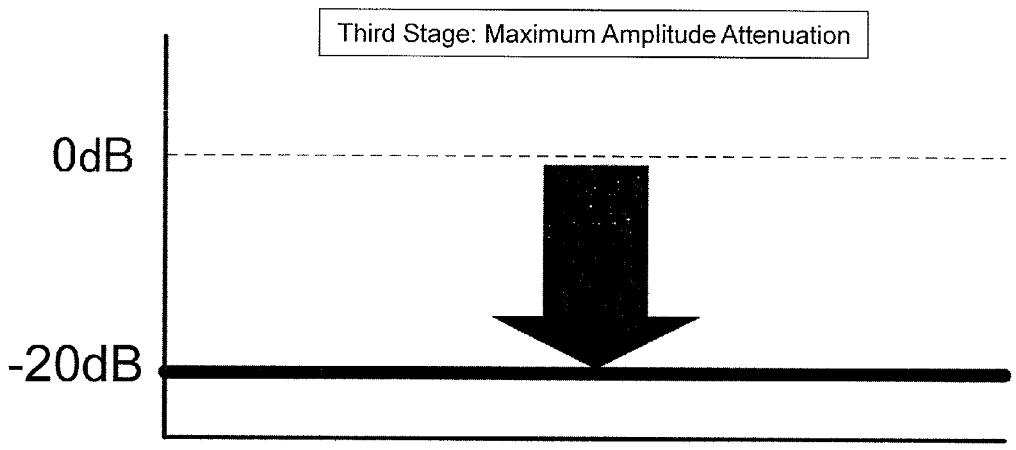
FIG. 12 is an explanatory view of sound-deadening control (third stage) in still another embodiment.

Although the case of using both the band-cut filter 8 and the amplitude attenuator 9 was shown in the above-stated embodiment, the scope of the present invention is not limited thereto. For example, as shown in FIG. 6, multi-stage acoustic feedback suppression control may be achieved only with the amplitude attenuator 9 and without the band-cut filter 8.

Although the case in which the sound-deadening control section 11 attenuates the amplitude in all the bands to the sound-deadening level was shown in the above-stated embodiment as an example of a structure for attenuating the amplitude of the sound signal output to the speaker to a specified level, the scope of the present invention is not limited thereto. For example, as shown in FIGS. 7 to 9 and FIGS. 10 to 12, the sound-deadening control section 11 may attenuate the sound signal input from the microphone to a low volume level. This is because occurrence of acoustic feedback can also be suppressed in the case where the sound signal is attenuated not to the sound-deadening level but to the low volume level. The low volume level used herein refers to a volume level, unlike the sound-deadening level, which is low but is still audibly amplified (e.g., −20 dB).

Although preferable embodiments of the present invention conceivable at the present moment have been described above, it should be understood that various modifications are possible for the embodiments disclosed and unless departing from the spirit and scope of the invention, such modifications are intended to be embraced in the scope of the appended claims.

INDUSTRIAL APPLICABILITY

As described above, the acoustic feedback suppression apparatus according to the present invention has an effect of allowing occurrence of acoustic feedback to be sufficiently suppressed while allowing occurrence of the phenomenon of a speech head interruption to be suppressed, and is beneficially used in the sound amplification system for amplifying with a speaker a sound signal input from a microphone and the like.

REFERENCE SIGNS LIST

1 Sound amplification system
2 Microphone
3 Acoustic feedback suppression apparatus
4 Power amplifier
5 Speaker
6 Amplitude measurement section
7 Acoustic feedback determination section
8 Band-cut filter
9 Amplitude attenuator
10 Control section
11 Sound-deadening control section
12 Sound-deadening release section

The invention claimed is:

1. An acoustic feedback suppression apparatus, comprising:

an amplitude measurer configured to measure amplitude of a sound signal input from a microphone;

an amplitude attenuator configured to attenuate amplitude of a sound signal output to a speaker;

an acoustic feedback determiner configured to determine whether or not acoustic feedback is occurring based on the sound signal input from the microphone;

a level controller configured to enable level control of the amplitude attenuator so as to attenuate the amplitude of the sound signal output to the speaker to a specified level if it is determined by the acoustic feedback determiner that acoustic feedback is occurring; and a level control releaser configured to maintain the level control of the amplitude attenuator if the amplitude of the sound signal measured by the amplitude attenuator is equal to or less than specified threshold amplitude while the level control is conducted, and release the level control of the amplitude attenuator if the amplitude of the sound signal measured by the amplitude measurer is more than the specified threshold amplitude and if it is determined by the acoustic feedback determiner that acoustic feedback is not occurring while the level control is conducted.

2. The acoustic feedback suppression apparatus according to claim 1, wherein the level controller is a sound-deadening controller configured to enable sound-deadening control of the amplitude attenuator so as to attenuate the amplitude of the sound signal output to the speaker to a sound-deadening level if it is determined by the acoustic feedback determiner that acoustic feedback is occurring, and the level control releaser is a sound-deadening releaser configured to maintain the sound-deadening control of the amplitude attenuator if the amplitude of the sound signal measured by the amplitude measurer is equal to or less than specified threshold amplitude in a state where the sound-deadening control is conducted, and release the sound-deadening control of the amplitude attenuator if the amplitude of the sound signal measured by the amplitude measurer is more than the specified threshold amplitude and if it is determined by the acoustic feedback determiner that acoustic feedback is not occurring in the state where the sound deadening control is conducted.

3. The acoustic feedback suppression apparatus according to claim 2, wherein the sound-deadening controller can perform multi-stage sound-deadening control, the multi-stage sound-deadening control including:

controlling the amplitude attenuator to enable intermediate control for attenuating the amplitude of the sound signal output to the speaker if it is determined that the acoustic feedback is occurring while sound-deadening control is not conducted; and controlling the amplitude attenuator to enable the sound-deadening control for attenuating the amplitude of the sound signal output to the speaker to the sound-deadening level if it is determined that the acoustic feedback is occurring in a second state where the intermediate control is conducted, and if the amplitude of the sound signal measured by the amplitude measurer is more than the threshold amplitude and if it is determined that the acoustic feedback is not occurring in a third state where the sound-deadening control is conducted, the sound-deadening releaser releases the sound-deadening control and returns the third state to the first state or the second state.

4. The acoustic feedback suppression apparatus according to claim 3, further comprising:

a band-pass filter configured to decrease amplitude in a specific frequency band of the sound signal output to the speaker, wherein the sound-deadening controller can perform multi-stage sound-deadening control, the multi-stage sound-deadening control including:

controlling at least one of the amplitude attenuator and the band-pass filter to enable intermediate control for attenuating or decreasing the amplitude of the sound signal output to the speaker if it is determined that the acoustic feedback is occurring in the first state where the sound-deadening control is not conducted; and controlling the amplitude attenuator to enable the sound-deadening control configured to attenuating the amplitude of the sound signal output to the speaker to the sound-deadening level if it is determined that the acoustic feedback is occurring in the second state where the intermediate control is conducted, and if the amplitude of the sound signal measured by the amplitude measurer is more than the threshold amplitude and if it is determined that the acoustic feedback is not occurring in the third state where the sound-deadening control is conducted, the sound-deadening releaser releases the sound-deadening control and returns the third state to the first state or the second state.

5. The acoustic feedback suppression apparatus according to claim 1, wherein the level controller is a low volume controller for enabling low volume control of the amplitude attenuator so as to attenuate the amplitude of the sound signal output to the speaker to a low volume level if it is determined by the acoustic feedback determiner that acoustic feedback is occurring, and the level control releaser is a low volume releaser configured to maintaining the low volume control of the amplitude attenuator if the amplitude of the sound signal measured by the amplitude measurer is equal to or less than specified threshold amplitude in a state where the sound-deadening control is conducted, and releasing the low volume control of the amplitude attenuator if the amplitude of the sound signal measured by the amplitude measurer is more than the specified threshold amplitude and if it is determined by the acoustic feedback determiner that acoustic feedback is not occurring.

6. The acoustic feedback suppression apparatus according to claim 5, wherein the low volume controller can enable multi-stage low volume control, the multi-stage low volume control including:

controlling the amplitude attenuator to enable intermediate control configured to attenuating the amplitude of the sound signal output to the speaker if it is determined that the acoustic feedback is occurring in a first state where low volume control is not conducted; and controlling the amplitude attenuator to enable the low volume control configured to attenuating the amplitude of the sound signal output to the speaker to the low volume level if it is determined that the acoustic feedback is occurring in a second state where the intermediate control is conducted, and if the amplitude of the sound signal measured by the amplitude measurer is more than the threshold amplitude and if it is determined that the acoustic feedback is not occurring in a third state where the low volume control is conducted, the low volume releaser releases the low volume control and returns the third state to the first state or the second state.

7. The acoustic feedback suppression apparatus according to claim 6, further comprising:

a band-pass filter configured to decrease amplitude in a specific frequency band of the sound signal output to the speaker, wherein the low volume controller can enable multi-stage low volume control, the multi-stage low volume control including:

controlling at least one of the amplitude attenuator and the band-pass filter to enable intermediate control for attenuating or decreasing the amplitude of the sound signal output to the speaker if it is determined that the acoustic feedback is occurring in the first state where low volume control is not conducted; and controlling the amplitude attenuator to enable the low volume control for attenuating the amplitude of the sound signal output to the speaker to the low volume level if it is determined that the acoustic feedback is occurring in the second state where the intermediate control is conducted, and if the amplitude of the sound signal measured by the amplitude measurer is more than the threshold amplitude and if it is determined that the acoustic feedback is not occurring in the third state where the low volume control is conducted, the low volume releaser releases the low volume control and returns the third state to the first state or the second state.

8. The acoustic feedback suppression apparatus according to claim 1, wherein the sound-deadening controller can perform multi-stage sound-deadening control, the multi-stage sound-deadening control including:

controlling the amplitude attenuator to enable intermediate control for attenuating the amplitude of the sound signal output to the speaker if it is determined that the acoustic feedback is occurring while sound-deadening control is not conducted; and controlling the amplitude attenuator to enable the sound-deadening control for attenuating the amplitude of the sound signal output to the speaker to the sound-deadening level if it is determined that the acoustic feedback is occurring in a second state where the intermediate control is conducted, and if the amplitude of the sound signal measured by the amplitude measurer is more than the threshold amplitude and if it is determined that the acoustic feedback is not occurring in a third state where the sound-deadening control is conducted, the sound-deadening releaser releases the sound-deadening control and returns the third state to the first state or the second state.

9. A microphone apparatus, comprising:

a microphone;

an amplitude measurer configured to measure amplitude of a sound signal input from the microphone;

an amplitude attenuator configured to attenuate amplitude of a sound signal output to a speaker;

an acoustic feedback determiner configured to determine whether or not acoustic feedback is occurring based on the sound signal input from the microphone;

a level controller configured to enable level control of the amplitude attenuator so as to attenuate the amplitude of the sound signal output to the speaker to a specified level if it is determined by the acoustic feedback determiner that acoustic feedback is occurring; and a level control releaser configured to maintain the level control of the amplitude attenuator if the amplitude of the sound signal measured by the amplitude measurer is equal to or less than specified threshold amplitude while the level control is conducted, and release the level control of the amplitude attenuator if the amplitude of the sound signal measured by the amplitude measurer is more than the specified threshold amplitude and if it is determined by the acoustic feedback determiner that acoustic feedback is not occurring while the level control is conducted.

10. An amplifier apparatus, comprising:

an amplifier configured to amplify a sound signal output to a speaker;

an amplitude measurer configured to measure amplitude of a sound signal input from a microphone;

an amplitude attenuator configured to attenuate amplitude of the sound signal output to the speaker;

an acoustic feedback determiner configured to determine whether or not acoustic feedback is occurring based on the sound signal input from the microphone;

a level controller configured to enable level control of the amplitude attenuator so as to attenuate the amplitude of the sound signal output to the speaker to a specified level if it is determined by the acoustic feedback determiner that acoustic feedback is occurring; and a level control releaser configured to maintain the level control of the amplitude attenuator if the amplitude of the sound signal measured by the amplitude measurer is equal to or less than specified threshold amplitude while the level control is conducted, and release the level control of the amplitude attenuator if the amplitude of the sound signal measured by the amplitude measurer is more than the specified threshold amplitude and if it is determined by the acoustic feedback determiner that acoustic feedback is not occurring while the level control is conducted.

11. A sound amplification system, comprising:

a microphone;

a speaker;

an amplifier configured to amplify a sound signal output to the speaker;

an amplitude measurer configured to measure amplitude of a sound signal input from the microphone;

an amplitude attenuator configured to attenuate amplitude of the sound signal output to the speaker;

an acoustic feedback determiner configured to determine whether or not acoustic feedback is occurring based on the sound signal input from the microphone;

a level controller configured to enable level control of the amplitude attenuator so as to attenuate the amplitude of the sound signal output to the speaker to a specified level if it is determined by the acoustic feedback determiner that acoustic feedback is occurring; and a level control releaser configured to maintain the level control of the amplitude attenuator if the amplitude of the sound signal measured by the amplitude measurer is equal to or less than specified threshold amplitude while the level control is conducted, and release the level control of the amplitude attenuator if the amplitude of the sound signal measured by the amplitude measurer is more than the specified threshold amplitude and if it is determined by the acoustic feedback determiner that acoustic feedback is not occurring while the level control is conducted.

12. An acoustic feedback suppression method, comprising:

determining whether or not acoustic feedback is occurring based on a sound signal input from a microphone;

conducting level control so as to attenuate amplitude of a sound signal output to a speaker to a specified level if it is determined that the acoustic feedback is occurring; and maintaining the level control if the amplitude of the sound signal input from the microphone is equal to or less than specified threshold amplitude while the level control is conducted, and releasing the level control if the amplitude of the sound signal input from the microphone is more than the specified threshold amplitude and if it is determined that acoustic feedback is not occurring while the level control is conducted.

* * * * *